(12) United States Patent
Araki

(10) Patent No.: US 8,102,200 B2
(45) Date of Patent: Jan. 24, 2012

(54) CURRENT CONTROL CIRCUIT

(75) Inventor: Norihiko Araki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/662,043

(22) Filed: Mar. 29, 2010

(65) Prior Publication Data

US 2010/0253316 A1    Oct. 7, 2010

(30) Foreign Application Priority Data

Apr. 7, 2009 (JP) .................................. 2009-093185

(51) Int. Cl.
 *G05F 1/10* (2006.01)
(52) U.S. Cl. ........................................ 327/538; 327/540
(58) Field of Classification Search .................. None
See application file for complete search history.

(56) References Cited

U.S. PATENT DOCUMENTS

| | | | | |
|---|---|---|---|---|
| 6,026,023 A * | 2/2000 | Tonda | ............ | 365/185.2 |
| 6,087,820 A * | 7/2000 | Houghton et al. | ............ | 323/315 |
| 6,097,159 A * | 8/2000 | Mogi et al. | ............ | 315/151 |
| 6,097,180 A * | 8/2000 | Tsukude et al. | ............ | 323/313 |
| 6,466,081 B1 * | 10/2002 | Eker | ............ | 327/541 |
| 7,518,437 B2 * | 4/2009 | Yamasaki | ............ | 327/543 |
| 7,570,107 B2 * | 8/2009 | Kim et al. | ............ | 327/539 |
| 7,616,458 B2 | 11/2009 | Motoyui | | |
| 2005/0030000 A1 * | 2/2005 | Hayashimoto | ............ | 323/313 |

FOREIGN PATENT DOCUMENTS

| | | |
|---|---|---|
| JP | 2003-204247 | 7/2003 |
| JP | 2007-244083 | 9/2007 |

* cited by examiner

*Primary Examiner* — An Luu
(74) *Attorney, Agent, or Firm* — McGinn International Property Law Group, PLLC

(57) ABSTRACT

A current control circuit in accordance an exemplary aspect of the present invention includes a first transistor that controls a current flowing to a load, a first resistor through which a current flows according to a current flowing through the first transistor, a control signal generation circuit that generates a control signal used to control the first transistor based on a comparison voltage and a predetermined reference voltage, the comparison voltage being determined based on a resistance value of the first resistor and a current flowing through the first resistor, and a reference voltage generation circuit that generates the reference voltage, the reference voltage generation circuit including a constant current source and a second resistor connected in series with the constant current source.

14 Claims, 5 Drawing Sheets

US 8,102,200 B2

CURRENT CONTROL CIRCUIT

INCORPORATION BY REFERENCE

This application is based upon and claims the benefit of priority from Japanese patent application No. 2009-093185, filed on Apr. 7, 2009, the disclosure of which is incorporated herein in its entirety by reference.

BACKGROUND

1. Field of the Invention The present invention relates to a current control circuit, in particular a current control circuit having a current sensing circuit.

2. Description of Related Art

In recent years, cameras of mobile phones are equipped with a zooming and focusing function. Therefore, the motors that control the lens position of such cameras have been required to operate with stability regardless of the temperature change.

Firstly, the motor needs to be supplied with a stable current to ensure the stable operation of the motor. Therefore, in general, a current control circuit is used. However, in the case of current control circuits in the related art, the resistance value of the sense resistor provided in those current control circuits changes as the temperature changes. As a result, the current flowing to the motor also fluctuates. Therefore, suppressing the fluctuation of the resistance value of the sense resistor due to the temperature change has been a significant problem to be solved.

For example, current control circuits equipped with a sense MOS transistor (hereinafter, simply referred to as "sense MOS") have been known as an IC (Integrated Circuit) capable of outputting a stable current to drive a motor for controlling a lens position.

FIG. 5 shows a current control circuit equipped with a sense MOS shown in Japanese Unexamined Patent Application Publication No. 2007-244083. Note that the circuit shown in FIG. 5 is an H-bridge type current control circuit 10. The circuit shown in FIG. 5 monitors a current flowing to the load (output current), and compares a voltage generated based on the current with a predetermined reference voltage. Then, by feeding back its comparison result, the circuit controls the output current with stability. Note that for the sake of simplifying the drawing, connection lines between the pre-driver 15 and the gates of TR2 and TR3 are omitted in FIG. 5.

As shown in FIG. 5, the current control circuit 10 includes an H-bridge circuit 11 composed of transistors TR1 to TR4, a triangular-wave generator 12, a superimposition circuit 12a, a reference DAC 13, a sense resistor SR1, a PWM comparator 14, a pre-driver circuit 15, a sense MOS 16, a transistor TR5, and an amplifier 18. Further, the current control circuit 10 drives a motor 17.

Note that the triangular-wave generator 12, the reference DAC 13, and the superimposition circuit 12a constitutes a reference voltage source. In this reference voltage source, the superimposition circuit 12a superimposes a triangular-wave signal having a predetermined frequency generated by the triangular-wave generator 12 on a reference level generated by the reference DAC 13 to output a reference signal V1.

The reference signal V1 is input to the non-inverting input terminal of the PWM comparator 14. Meanwhile, a sense signal Vs that changes according to the current flowing to the load is input to the inverting input terminal of the PWM comparator 14. The PWM comparator 14 compares the reference signal V1 with the sense signal Vs to output a PWM signal Vp.

The PWM signal Vp is input to the pre-driver circuit 15. The pre-driver circuit 15 outputs a switching signal(s) based on the PWM signal Vp. The switching signal(s) is used to perform the switching of the transistors TR1 to TR4 of the H-bridge circuit 11.

The H-bridge circuit 11 is composed of four transistors TR1 to TR4 provided between a high-potential side power supply VM and a low-potential side power supply GND. Further, the H-bridge circuit 11 can change the direction of the current flowing through the motor 17. Note that the transistors TR1 and TR3 are P-channel MOS transistors, and the transistors TR2 and TR4 are N-channel MOS transistors.

As for specific operations, the H-bridge circuit 11 lets a current flow from the high-potential side power supply VM through the transistor TR1, the motor 17, and the transistor TR4 to the low-potential side power supply GND, for example, by turning on the transistors TR1 and TR4 and turning off the transistors TR2 and TR3. On the other hand, by turning off the transistors TR1 and TR4 and turning on the transistors TR2 and TR3, the H-bridge circuit 11 lets a current flow from the high-potential side power supply VM through the transistor TR3, the motor 17, and the transistor TR3 to the low-potential side power supply GND.

Note that FIG. 5 shows an example of a state of the circuit in which: the transistor TR1 is in an On-state; the transistors TR2 and TR3 are in an Off-state; and On-Off switching control (PWM control) is performed on the transistor TR4. As a result, the current flowing from the high-potential side power supply VM through the transistor TR1, the motor 17, and the transistor. TR4 to the low-potential side power supply GND is controlled.

Further, when the direction of the current flowing through the motor is to be changed, the transistor TR3 is turned on and the transistors TR1 and TR4 are turned off. Further, On-Off switching control (PWM control) is performed on the transistor TR2 in that state. As a result, the current flowing from the high-potential side power supply VM through the transistor TR3, the motor 17, and the transistor TR2 to the low-potential side power supply GND can be controlled. Note that in this case, some necessary switching is performed so that the gate voltage of the transistor TR3 is applied to the gate of the sense MOS 16 and that the voltage on the right side of the motor 17 (in the drawing) is input to the non-inverting input terminal of the amplifier 18.

Note that an assumption is made that each of the transistors that are turned on, among the transistors TR1 to TR4, has a voltage equal to the potential difference between the high-potential side power supply VM and the low-potential side power supply GND between its gate and source. That is, assume that those transistors are in the completely-on state (Fully-On state).

Further, the circuit shown in FIG. 5 is explained as an example where one H-bridge circuit 11 is provided to drive one load (motor 17). However, in the case of driving a stepping motor or the like, the circuit needs to be equipped with two or more than two H-bridge circuits.

Next, a current flows to the sense MOS 16 based on the current value supplied to the motor 17. A sense signal Vs is generated based on the current flowing to the sense MOS 16 and the resistance value of sense resistor SR1. Note that the amplifier 18 controls the transistor TR5 such that the drain voltage of the transistor TR1 becomes equal to the drain voltage of the sense MOS 16. In this manner, the related art controls the current flowing to the load.

Note that, as for the reference voltage (reference signal V1), various voltages including ones shown below may be used. In a case where the reference voltage is formed by a DC voltage alone (FIG. 2A), the output current flowing to the motor 17 has a waveform shown in FIG. 2B. Further, waveforms of reference voltages that are formed by superimposing a triangular wave for driving a PWM on a DC voltage are shown in FIGS. 3A and 3B. Further, waveforms of reference voltages that are formed by superimposing a triangular wave for driving a PWM on a half-wave SIN wave voltage based on the output signal of the reference DAC 13 are shown in FIGS. 4A and 4B. As shown in FIGS. 2A and 2B to FIGS. 4A and 4B, the output current waveforms to the load corresponding to the respective reference voltages have a triangle-shaped ripple component. In the case of FIG. 2B, the ripple component of the output current has a frequency according to the load (e.g., motor 17) and the resistive component. Further, in the cases of FIGS. 3B and 4B, the ripple component of the output current has a frequency according to the triangular wave.

Further, Japanese Unexamined Patent Application Publication No. 2003-204247 discloses a variable resistance circuit using a MOS transistor as a variable resistor. The circuit shown in Japanese Unexamined Patent Application Publication No. 2003-204247 can adjust a current ratio between two constant current sources (constant current sources 12 and 13 in Japanese Unexamined Patent Application Publication No. 2003-204247). That is, the circuit shown in Japanese Unexamined Patent Application Publication No. 2003-204247 controls the resistance value of a transistor 6 (transistor 6 in Japanese Unexamined Patent Application Publication No. 2003-204247) and the resistance value of a transistor 8 (transistor 8 in Japanese Unexamined Patent Application Publication No. 2003-204247), which is an equivalent resistor of the transistor 6, by adjusting the current ratio between two constant current sources.

SUMMARY

The present inventors have found a problem described below. Note that the current control circuit shown in FIG. 5 includes a sense resistor SR1. A sense signal Vs is generated based on this sense resistor SR1 and the current flowing to the load. However, the sense resistor SR1 involves temperature dependence. That is, the resistance value of the sense resistor SR1 changes as the temperature changes. As a result, the current flowing to the motor 17 also fluctuates.

Accordingly, there has been a problem in current control circuits in the related art that the current cannot be supplied with high accuracy due to the temperature change.

A first exemplary aspect of the present invention is a current control circuit including: a first transistor that controls a current flowing to a load (e.g., transistor 110 in an exemplary embodiment of the present invention); a first resistor through which a current flows according to a current flowing through the first transistor (e.g., sense resistor 113 in an exemplary embodiment of the present invention); a control signal generation circuit that generates a control signal used to control the first transistor based on a comparison voltage and a predetermined reference voltage, the comparison voltage being determined based on a resistance value of the first resistor and a current flowing through the first resistor (e.g., control signal generation circuit 121 in an exemplary embodiment of the present invention); and a reference voltage generation circuit that generates the reference voltage, the reference voltage generation circuit including a constant current source (e.g., constant current source 119 in an exemplary embodiment of the present invention) and a second resistor connected in series with the constant current source (e.g., resistor 120 in an exemplary embodiment of the present invention).

With the circuit configuration described above, it is possible to supply a current with high accuracy regardless of the temperature change.

The present invention, in an exemplary aspect, can provide a current control circuit capable of supplying a current with high accuracy regardless of the temperature change.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EMPLARY EMBODIMENTS

Specific exemplary embodiments to which the present invention is applied are explained hereinafter in detail with reference to the drawings. For clarifying the explanation, duplicated explanation is omitted as appropriate.

First Exemplary Embodiment

Figure 1:
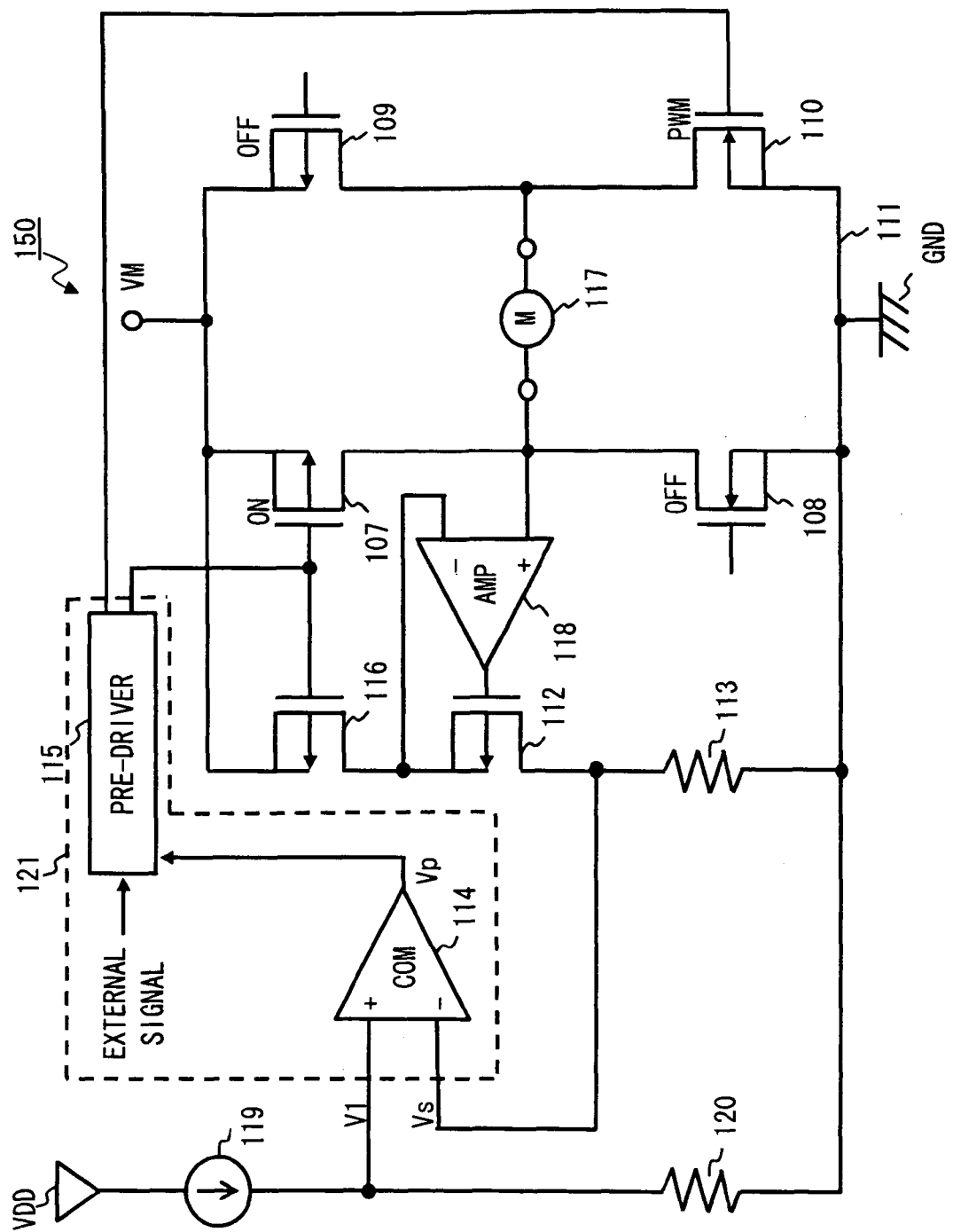
FIG. 1 shows a current control circuit in accordance with a first exemplary embodiment of the present invention.
Figure 2B:
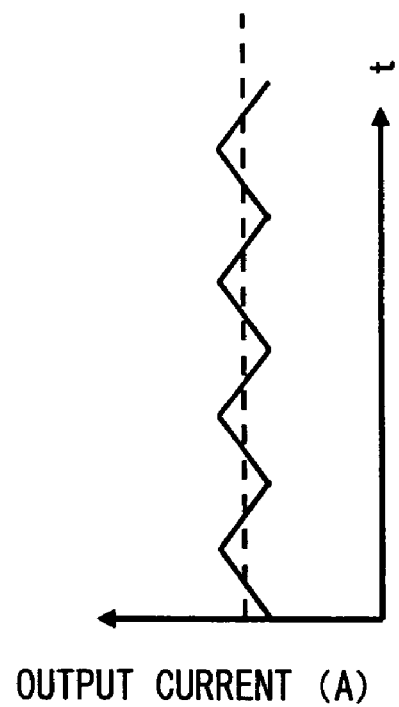
FIG. 2B is a timing chart of an output current in a case where a reference voltage is formed by a DC voltage.
Figure 2A:
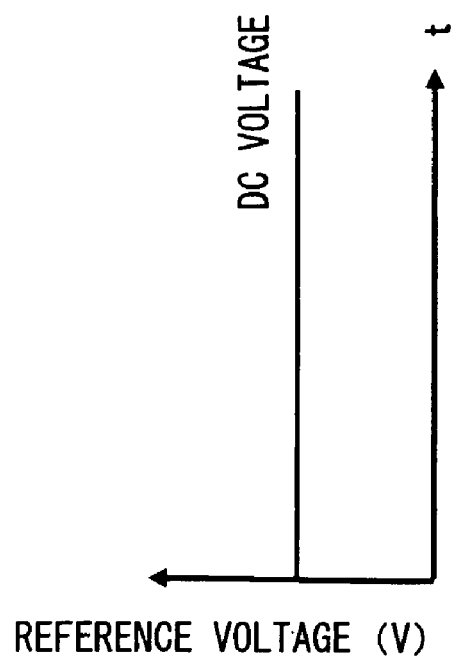
FIG. 2A is a timing chart of a reference voltage formed by a DC voltage.
Figure 3B:
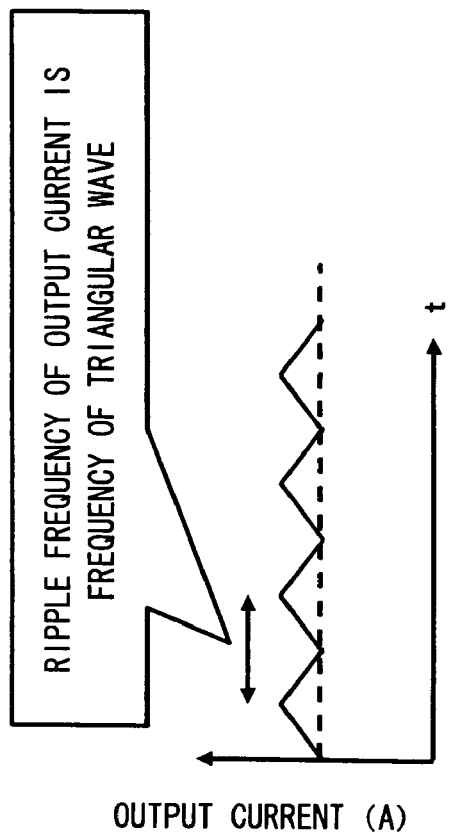
FIG. 3B is a timing chart of an output current in a case where a reference voltage is formed by superimposing a triangular wave for driving a PWM on a DC voltage.
Figure 3A:
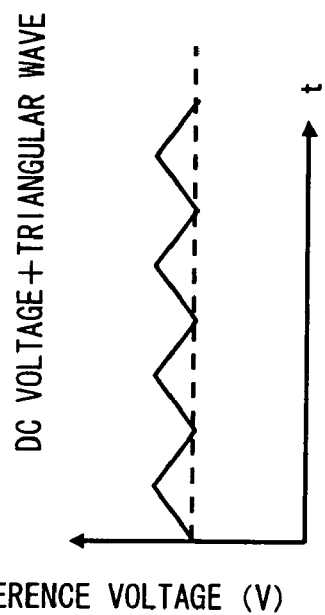
FIG. 3A is a timing chart of a reference voltage formed by superimposing a triangular wave for driving a PWM on a DC voltage.
Figure 4B:
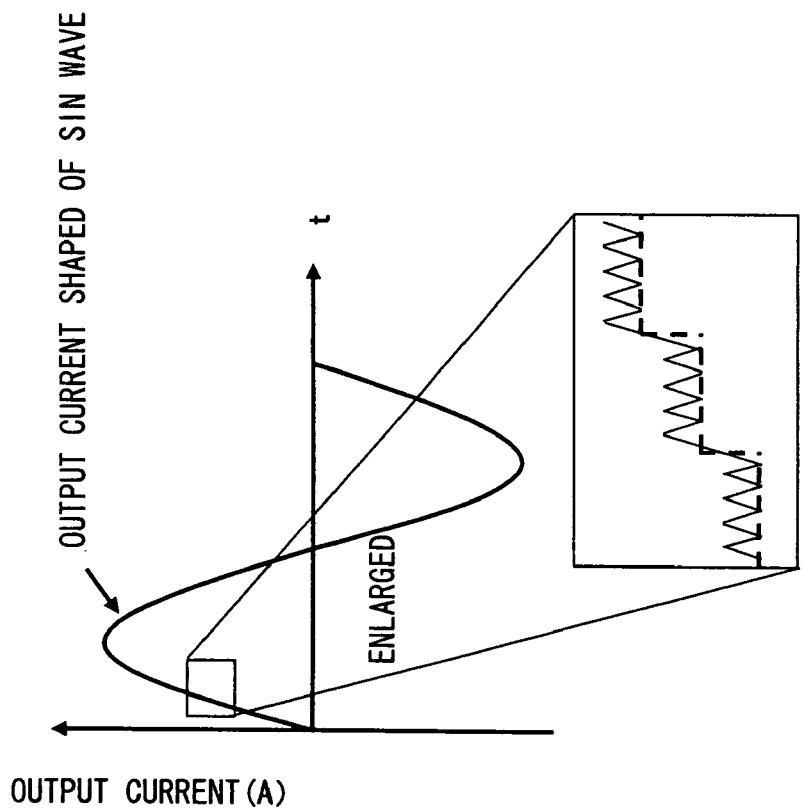
FIG. 4B is a timing chart of an output current in a case where a reference voltage is formed by superimposing a triangular wave for driving a PWM on a half-wave SIN wave voltage.
Figure 4A:
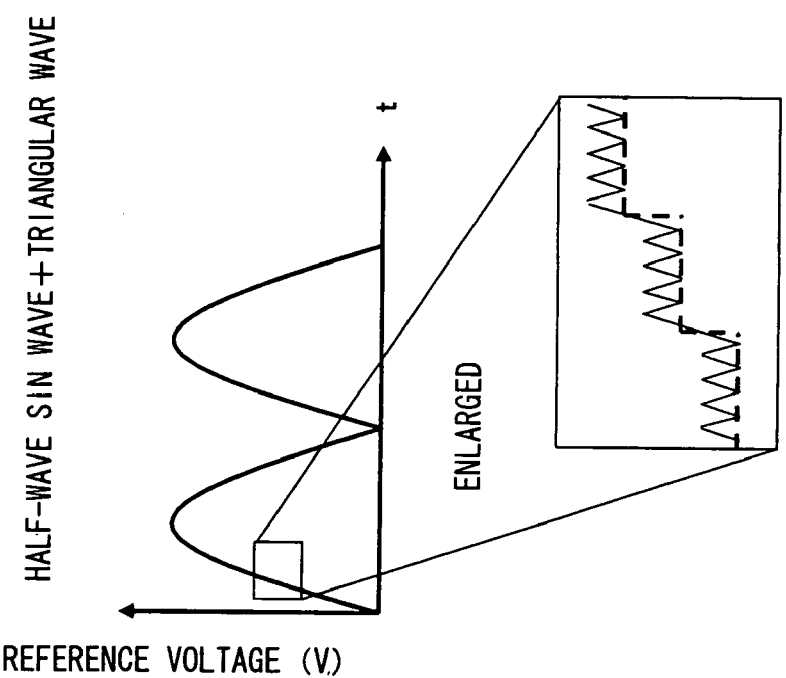
FIG. 4A is a timing chart of a reference voltage formed by superimposing a triangular wave for driving a PWM on a half-wave SIN wave voltage.

Exemplary embodiments of the present invention are explained with reference to the drawings. FIG. 1 shows a current control circuit 150 in accordance with exemplary embodiment of the present invention. Note that the current control circuit 150 shown in FIG. 1 is characterized in that it includes a constant current source 119 and a resistor 120 to generate a reference voltage, and by doing so, can supply a current with high accuracy regardless of the temperature change. Note that for the sake of simplifying the drawing, connection lines between the pre-driver 115 and the gates of transistors TR108 and TR109 are omitted in FIG. 1.

The current control circuit 150 shown in FIG. 1 includes an H-bridge circuit 111, a transistor 112 (fourth transistor), a sense resistor 113 (first resistor), a sense MOS 116 (second transistor), an amplifier 118 (second comparison circuit), a constant current source 119, a resistor 120 (second resistor), and a control signal generation circuit 121. Further, the current control circuit 150 drives a motor 117. Furthermore, the H-bridge circuit 111 includes a transistor 107 (third transistor), a transistor 108 (sixth transistor), a transistor 109 (fifth transistor), and a transistor 110 (first transistor). Furthermore, the control signal generation circuit 121 includes a PWM comparator 114 (first comparison circuit) and a pre-driver circuit 115.

Note that a current control circuit 150 in accordance with an exemplary embodiment of the present invention is explained by using an example where the sense MOS 116, the transistors 107, 109, and 112 are P-channel MOS transistors, and the transistors 108 and 110 are N-channel MOS transistors.

The input terminal of the constant current source 119 is connected to a high-potential side power supply VDD. The output terminal of the constant current source 119 is connected to the non-inverting input terminal of the PWM comparator 114 and one of the terminals of the resistor 120. The other terminal of the resistor 120, one of the terminals of the sense resistor 113, and the sources of the transistors 108 and 110 are connected to a low-potential side power supply GND.

The other terminal of the sense resistor 113 is connected to the drain of the transistor 112 and the inverting input terminal of the PWM comparator 114. The output terminal of the PWM comparator 114 is connected to the input terminal of the pre-driver circuit 115. One of the output terminals of the pre-driver circuit 115 is connected to the gate of the transistor 107 and the gate of the sense MOS 116. The other output terminal of the pre-driver circuit 115 is connected to the gate of the transistor 110. Note that an external signal(s) that is used to control the switching operation of each of the transistors 107 to 110 is also input to the pre-driver circuit 115. Further, other output terminals of the pre-driver circuit 115 are also connected to the gates of the transistors 109 and 108 (though they are not shown in the drawing).

The sources of the transistors 107 and 109 and the source of the sense MOS 116 are connected to a high-potential side power supply VM. The drain of the transistor 107 (first terminal of third transistor) is connected to the drain of the transistor 108, the non-inverting input terminal of the amplifier 118, and one of the terminals of the motor 117. The drain of the transistor 109 is connected to the drain of the transistor 110 and the other terminal of the motor 117. The drain of the sense MOS 116 (first terminal of second transistor) is connected to the source of the transistor 112 and the inverting input terminal of the amplifier 118. The output terminal of the amplifier 118 is connected to the gate of the transistor 112.

Next, operations are explained hereinafter. A predetermined reference voltage V1 is generated based on a constant current output from the constant current source 119 and a resistance value of the resistor 120. The reference voltage V1 is input to the non-inverting input terminal of the PWM comparator 114. Further, a sense voltage Vs, which is determined based on a current flowing to the load, i.e., motor 117 and a resistance value of the sense resistor 113, is input to the inverting input terminal of the PWM comparator 114.

The PWM comparator 114 compares the sense signal Vs with the reference voltage V1 and outputs the comparison result. For example, when the reference voltage V1 is larger than the sense signal Vs, the PWM comparator 114 outputs a PWM signal Vp having a High level, whereas when the reference voltage V1 is smaller than the sense signal Vs, it outputs a PWM signal Vp having a Low level. The PWM signal Vp is input to the pre-driver circuit 115. The pre-driver circuit 115 outputs a switching signal(s) based on the PWM signal Vp. The switching signal(s) are used to perform switching of the transistors 107 to 110 provided in the H-bridge circuit 111.

The H-bridge circuit 111 is composed of four transistors 107 to 110 provided between the high-potential side power supply VM and the low-potential side power supply GND. Further, the H-bridge circuit 111 can change the direction of the current flowing through the motor 117.

As for specific operations, the H-bridge circuit 111 lets a current flow from the high-potential side power supply VM through the transistor 107, the motor 117, and the transistor 110 to the low-potential side power supply GND, for example, by turning on the transistors 107 and 110 and turning off the transistors 108 and 109. On the other hand, by turning off the transistors 107 and 110 and turning on the transistors 108 and 109, the H-bridge circuit 111 lets a current flow from the high-potential side power supply VM through the transistor 109, the motor 117, and the transistor 108 to the low-potential side power supply GND. In this way, by performing On-Off control on the transistors 107 to 110 with the switching signal(s) output from the pre-driver circuit 115, the direction of the current flowing through the motor 117 can be changed.

Note that FIG. 1 shows an example of a state of the circuit in which: the transistor 107 is in an On-state; the transistors 108 and 109 are in an Off-state; and On-Off switching control (PWM control) is performed on the transistor 110. As a result, the current flowing from the high-potential side power supply VM through the transistor 107, the motor 117, and the transistor 110 to the low-potential side power supply GND is controlled.

Note that the On-Off state of the transistor 110 is controlled by a switching signal (PWM signal) output from the pre-driver circuit 115. That is, the time during which the transistor 110 is in an On-state is controlled according to the pulse width of the switching signal (PWM signal). By doing so, the current flowing to the motor 117 is also controlled. For example, when the pulse width of the switching signal is wide (duty ratio is high), the time during which the transistor 110 is in an On-state becomes longer. As a result, the current flowing to the motor 117 increases.

In addition, in the case in which the transistors 109, 107, and 110 are in an On-state, an Off-state, and an Off-sate respectively and On-Off switching control (PWM control) is performed on the transistor 108, the current flowing to the motor 117 can be also controlled in a similar manner. Specifically, the On-Off state of the transistor 108 is controlled by a switching signal (PWM signal) output from the pre-driver circuit 115. That is, the time during which the transistor 108 is in an On-state is controlled according to the pulse width of the switching signal. By doing so, the current flowing to the motor 117 is also controlled.

Note that an assumption is made that each of the transistors that are turned on, among the transistors 107 to 110, has a voltage equal to the potential difference between the high-potential side power supply VM and the low-potential side power supply GND between its gate and source in a current control circuit in accordance with an exemplary embodiment of the present invention. That is, assume that those transistors are in the completely-on state (Fully-On state).

Further, the circuit shown in FIG. 1 is explained as an example where one H-bridge circuit is provided to drive one load (motor 117). However, in the case of driving a stepping motor or the like, the circuit needs to be equipped with two or more than two H-bridge circuits. In the circuit shown in FIG. 1, a circuit configuration in which two or more than two H-bridge circuits are used, in place of one H-bridge circuit, can be used.

Next, a current flows to the sense MOS 116 based on the current value supplied to the motor 117. Then, a sense signal Vs is generated based on the current flowing to the sense MOS 116 and the resistance value of the sense resistor 113. Note that the amplifier 118 controls the current flowing to the transistor 112 such that the drain voltage of the transistor 107 becomes equal to the drain voltage of the sense MOS 116. The sense signal Vs, which is adjusted in this manner, is input to the inverting input terminal of the PWM comparator 114. Then, as described previously, the pre-driver circuit 115 outputs a switching signal based on a comparison result of the PWM comparator 114.

Note that the resistor 120, which is used to generate the reference voltage V1, and the sense resistor 113, which is used to generate the sense signal Vs, have the same characteristics as each other. Note that the term "same characteristics" means that the resistive components, which fluctuate due to the temperature change, are substantially equal to each other. Since the resistor 120 and the sense resistor 113 have the same characteristics as each other as described above, their temperature characteristics can be cancelled out by each other even when the temperature has changed. That is, the current control circuit in accordance with an exemplary embodiment of the present invention can supply a current with high accuracy regardless of the temperature characteristic.

Note that various types of waveforms of the reference voltage V1 like ones shown in FIGS. 2A and 2B to FIGS. 4A and 4B can be easily generated by changing the current value of the constant current source 119. That is, output currents similar to those in the related art can be supplied to the load (motor 117).

Figure 5:
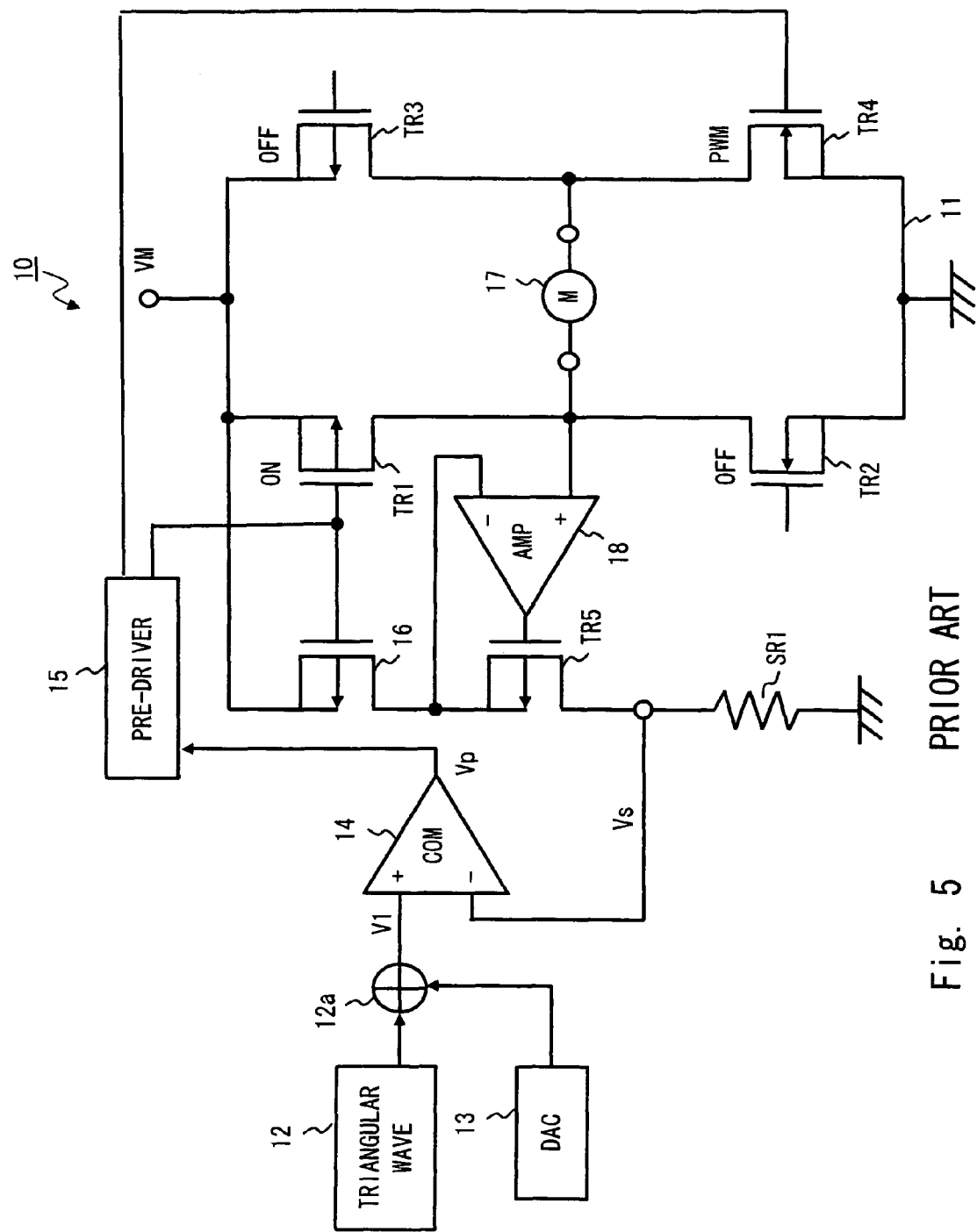
FIG. 5 shows a current control circuit in related art.

Hereinafter, an output current is calculated for each of the current control circuit in the related art (FIG. 5) and the current control circuit in accordance with an exemplary embodiment of the present invention (FIG. 1). In the current control circuit in the related art shown in FIG. 5, assume that: the current flowing to the sense resistor SR1 is I1; the resistance value of the sense resistor SR1 is R1; the temperature fluctuation of the sense resistor SR1 is +10%; the sense ratio (transistor TR1/transistor 16) is Z; and the reference voltage is VREF. Further, assume also that voltages input to the non-inverting input terminal and the inverting input terminal of the PWM comparator 14 are equal to each other.

With these assumptions, the following equation is established. Output current in the normal state $=I1 \times Z=(VREF/R1) \times Z$. Output current when temperature has changed $=I1 \times Z=(VREF/(R1 \times 1.1)) \times Z=0.91(VREF/R1) \times Z$. As shown above, in the case of the current control circuit in the related art shown in FIG. 5, the output current fluctuates due to the temperature change.

Meanwhile, in the current control circuit in accordance with an exemplary embodiment of the present invention shown in FIG. 1, assume that: the current flowing to the sense resistor 113 is I1; the value of the sense resistor 113 is R1; the temperature fluctuations of the sense resistor 113 and the resistor 120 are +10%; the sense ratio (transistor 107/transistor 116) is Z; and the reference current is I2. Further, assume also that voltages input to the non-inverting input terminal and the inverting input terminal of the PWM comparator 114 are equal to each other.

With these assumptions, the following equation is established. Output current in the normal state $=I1 \times Z=(V1/R1) \times Z=((I2 \times R2)/R1) \times Z$. Output current when temperature has changed $=((I2 \times R2 \times 1.1)/(R1 \times 1.1)) \times Z=((I2 \times R2)/R1) \times Z$. As shown above, in the current control circuit in accordance with an exemplary embodiment of the present invention shown in FIG. 1, the output current does not fluctuate due to the temperature change.

As described above, a current control circuit in accordance with an exemplary embodiment of the present invention can supply a current with high accuracy regardless of a temperature change owing to the feature that the sense resistor 113 and the resistor 120 have the same characteristics as each other. Further, it seems that the current control circuit also involves fluctuations mainly due to the temperature fluctuations such as the temperature fluctuation of the reference voltage value, the temperature fluctuation of the offset value of the PWM comparator 114, the temperature fluctuation of the sense ratio between the sense MOS 116 and transistor 107, and the temperature fluctuation of the sense resistor 113. Among these, the current control circuit in accordance with an exemplary embodiment of the present invention can suppress the effect due to the temperature fluctuation of the sense resistor 113 by including the resistor 120. Further, it is also possible to provide a current control circuit capable of supplying a current with high accuracy without raising the unit price of the ICs.

Note that in the current control circuit in accordance with an exemplary embodiment of the present invention, the ratio between the currents flowing through the mirror circuit (sense MOS 116 and transistor 107) is fixed at a constant value in contrast to the technique disclosed in Japanese Unexamined Patent Application Publication No. 2003-204247. Further, the sense MOS 116 is used to monitor the current flowing through the transistor 107. That is, the circuit shown in Japanese Unexamined Patent Application Publication No. 2003-204247 and the current control circuit in accordance with an exemplary embodiment of the present invention are different from each other in their circuit configurations and technical fields.

Note that the present invention is not limited to above-described exemplary embodiments, and they can be modified as appropriate without departing from the spirit of the present invention. For example, although the H-bridge circuit 111 is explained by using an example where the MOS transistors 107 to 110 are provided, it is not limited to this example. For example, a circuit configuration in which the transistors 107 and 109 are PNP-type bipolar transistors and the transistors 108 and 110 are NPN-type bipolar transistors can be also used. Further, a circuit configuration in which the sense MOS 116 and the transistor 112 are PNP-type bipolar transistors can be also used.

Furthermore, although an example where an H-bridge circuit is used as the circuit to control the current flowing to the load is explained in the exemplary embodiments of the present invention, it is not limited to those examples. For example, a circuit configuration in which a single transistor is used, in place of the H-bridge circuit, to control the current flowing to the load can be also used as appropriate.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A current control circuit comprising:
   a first transistor that controls a current flowing to a load;
   a first resistor through which a current flows according to a current flowing through the first transistor;
   a control signal generation circuit that generates a control signal used to control the first transistor based on a comparison voltage and a predetermined reference voltage, the comparison voltage being determined based on a resistance value of the first resistor and a current flowing through the first resistor, an external input signal providing an input control signal into the control signal generation circuit; and a reference voltage generation circuit that generates the reference voltage, the reference voltage generation circuit comprising a constant current source and a second resistor connected in series with the constant current source.

2. The current control circuit according to claim 1, wherein the first and second resistors have same temperature characteristics as each other.

3. The current control circuit according to claim 1, wherein the control signal generation circuit comprises:
a first comparison circuit that compares the reference voltage with the comparison voltage and outputs a first comparison result; and
a pre-driver circuit that outputs the control signal based on the first comparison result.

4. The current control circuit according to claim 1, further comprising a second transistor through which a current flows according to a current flowing through the first transistor,
wherein a current flows to the first resistor according to a current flowing through the second transistor.

5. The current control circuit according to claim 4, further comprising:
a third transistor connected to the second transistor in a current mirror connection, the third transistor being configured to perform On-Off switching control for a current flowing to the load;
a second comparison circuit that compare a voltage at a first terminal of the second transistor with a voltage at a first terminal of the third transistor and outputs a second comparison result; and
a fourth transistor connected in series with the second transistor, the fourth transistor being configured to control a current flowing through the second transistor based on the second comparison result.

6. The current control circuit according to claim 5, wherein the second and third transistors are P-channel MOS transistors.

7. The current control circuit according to claim 5, wherein the second and third transistors are PNP-type bipolar transistors.

8. The current control circuit according to claim 5, wherein the fourth transistor is a P-channel MOS transistor.

9. The current control circuit according to claim 5, wherein the fourth transistor is a PNP-type bipolar transistor.

10. The current control circuit according to claim 5, further comprising:
a fifth transistor connected in series with the first transistor; and
a sixth transistor connected in parallel with the first and fifth transistors, the sixth transistor being also connected in series with the third transistor,
wherein the load is connected between a node at which the first and fifth transistors are connected and a node at which the third and sixth transistors are connected.

11. The current control circuit according to claim 1, wherein the load comprises a motor.

12. The current control circuit according to claim 5, wherein the current mirror connection is due to commonly-connected control terminals of the second and third transistors.

13. A current control circuit, comprising:
a first transistor that controls a current flowing to a motor;
a first resistor through which a current flows according to a current flowing through the first transistor;
a control signal generation circuit that generates a control signal used to control the first transistor based on a comparison voltage and a predetermined reference voltage, the comparison voltage being determined based on a resistance value of the first resistor and a current flowing through the first resistor; and
a reference voltage generation circuit that generates the reference voltage, the reference voltage generation circuit comprising a constant current source and a second resistor connected in series with the constant current source,
wherein the first resistor and the second resistor have same temperature characteristics as each other, and the control signal generation circuit receives an external signal to control an operation of the current control circuit.

14. A circuit, comprising:
a motor; and
a current control circuit to provide current to the motor,
wherein the current control circuit comprises:
a first transistor that controls a current flowing to a motor;
a first resistor through which a current flows according to a current flowing through the first transistor;
a control signal generation circuit that generates a control signal used to control the first transistor based on a comparison voltage and a predetermined reference voltage, the comparison voltage being determined based on a resistance value of the first resistor and a current flowing through the first resistor; and
a reference voltage generation circuit that generates the reference voltage, the reference voltage generation circuit comprising a constant current source and a second resistor connected in series with the constant current source,
wherein the first resistor and the second resistor have same temperature characteristics as each other, and the control signal generation circuit receives an external signal to control an operation of the current control circuit.

* * * * *